US009462259B2

(12) United States Patent
Adachi (10) Patent No.: US 9,462,259 B2
(45) Date of Patent: Oct. 4, 2016

(54) ELECTRONIC DEVICE (75) Inventor: Yoshikazu Adachi, Tokyo (JP)

(73) Assignee: KYOCERA CORPORATION, Kyoto (JP)

( * ) Notice: Subject to any disclaimer, the term of this patent is extended or adjusted under 35 U.S.C. 154(b) by 304 days.

(21) Appl. No.: 14/007,293

(22) PCT Filed: Mar. 22, 2012

(86) PCT No.: PCT/JP2012/057366
§ 371 (c)(1),
(2), (4) Date: Sep. 24, 2013

(87) PCT Pub. No.: WO2012/133117
PCT Pub. Date: Oct. 4, 2012

(65) Prior Publication Data
US 2014/0015937 A1 Jan. 16, 2014

(30) Foreign Application Priority Data

Mar. 25, 2011 (JP) ................................. 2011-068935

(51) Int. Cl.
H04N 13/04 (2006.01)
H04N 13/00 (2006.01)
H04N 13/02 (2006.01)

(52) U.S. Cl.
CPC ...... H04N 13/0425 (2013.01); H04N 13/0022 (2013.01); H04N 13/0239 (2013.01); H04M 2250/52 (2013.01); H04N 2013/0081 (2013.01)

(58) Field of Classification Search
CPC ..................... H04N 13/0022; H04N 13/0239; G06T 7/0075; G06T 19/006; G06T 2207/10012
See application file for complete search history.

(56) References Cited

U.S. PATENT DOCUMENTS

2004/0240056 A1 12/2004 Tomisawa et al.
2006/0192776 A1 8/2006 Nomura et al.
2008/0112616 A1* 5/2008 Koo .................... H04N 13/0022
382/171

(Continued)

FOREIGN PATENT DOCUMENTS

JP    11-341518 A    12/1999
JP    2000-092517 A    3/2000

(Continued)

OTHER PUBLICATIONS

International Search Report and Written Opinion corresponding to PCT/JP2012/057366, dated Apr. 24, 2012.

(Continued)

Primary Examiner — Jay Patel
Assistant Examiner — Neil Mikeska
(74) Attorney, Agent, or Firm — Hauptman Ham, LLP (57) ABSTRACT According to an aspect, an electronic device includes: an operating unit; a display unit for displaying a plurality of images in a superposed manner to display a three-dimensional image; a storage unit for storing a plurality of pieces of image data that form the three-dimensional image together with each other; and a control unit configured to determine a correction value for stereoscopic effect of an object of the three-dimensional image based on an operation detected by the operating unit, correct a position of the object in at least one of the plurality of images that form the three-dimensional image based on the correction value for the stereoscopic effect of the object, and superpose the plurality of images including the corrected image on the display unit to display the object as a three-dimensional image.

6 Claims, 10 Drawing Sheets

(56) References Cited

U.S. PATENT DOCUMENTS

| | | | |
|---|---|---|---|
| 2011/0007135 A1 | 1/2011 | Okada et al. | |
| 2011/0117958 A1* | 5/2011 | Kim | H04M 1/0264 455/556.1 |
| 2011/0157155 A1* | 6/2011 | Turner | G06T 19/00 345/419 |
| 2011/0273437 A1* | 11/2011 | Sanderson | H04N 13/0497 345/419 |
| 2012/0038745 A1* | 2/2012 | Yu | H04N 13/0022 348/46 |
| 2012/0084652 A1* | 4/2012 | Martinez Bauza | H04N 13/0007 715/719 |
| 2012/0200670 A1* | 8/2012 | Pockett | H04N 13/0203 348/46 |
| 2012/0242803 A1* | 9/2012 | Tsuda | H04N 13/0022 348/46 |
| 2012/0288184 A1* | 11/2012 | Zomet | G02B 3/005 382/154 |
| 2012/0327197 A1* | 12/2012 | Yamashita | G03B 35/08 348/50 |
| 2013/0100257 A1* | 4/2013 | Sawachi | H04N 13/0246 348/49 |
| 2015/0154788 A1* | 6/2015 | Zomet | G02B 3/005 345/419 |

FOREIGN PATENT DOCUMENTS

| | | |
|---|---|---|
| JP | 2000-134641 A | 5/2000 |
| JP | 2003-209858 A | 7/2003 |
| JP | 2003-264851 A | 9/2003 |
| JP | 2004-070302 A | 3/2004 |
| JP | 2004-200973 A | 7/2004 |
| JP | 2004-349736 A | 12/2004 |
| JP | 2004-363680 A | 12/2004 |
| JP | 2009-042082 A | 2/2009 |
| JP | 2009-53748 A | 3/2009 |
| JP | 2011-019084 A | 1/2011 |

OTHER PUBLICATIONS

Office Action mailed May 19, 2015, corresponding to Japanese patent application No. 2011-068935, for which an explanation of relevance is attached.

* cited by examiner

ELECTRONIC DEVICE

CROSS-REFERENCE TO RELATED APPLICATION

This application is a National Stage of PCT international application Ser. No. PCT/JP2012/057366 filed on Mar. 22, 2012 which designates the United States, and which is based upon and claims the benefit of priority from Japanese Patent Application No. 2011-068935 filed on Mar. 25, 2011.

FIELD

The present disclosure relates to an electronic device for displaying a three-dimensional image.

BACKGROUND

In recent years, an electronic device for displaying a three-dimensional image has been proposed. A device for capturing a three-dimensional image to be displayed on the electronic device arranges, for example, mirrors or the like to capture two images at angles displaced from each other, thereby enabling capture of the images reproducible as a three-dimensional image (see Patent Literatures 1, 2, and 3). Images reproducible as a three-dimensional image can also be captured by arranging a plurality of imaging devices and simultaneously capturing images by the respective imaging devices (see Patent Literature 4).

CITATION LIST

Patent Literature

Patent Literature 1: JP-A-2000-92517
Patent Literature 2: JP-A-2000-134641
Patent Literature 3: JP-A-2004-70302
Patent Literature 4: JP-A-11-341518

TECHNICAL PROBLEM

The images captured by using the methods described in Patent Literatures 1 to 4 are displayed in a superposed manner, so that the images can be displayed as a three-dimensional image. However, even if acquired two images are superposed on each other, a three-dimensional image sometimes does not come up to user's expectation.

For the foregoing reasons, an electronic device capable of appropriately displaying a three-dimensional image.

SOLUTION TO PROBLEM

According to an aspect, an electronic device includes: an operating unit; a display unit for displaying a plurality of images in a superposed manner to display a three-dimensional image; a storage unit for storing a plurality of pieces of image data that form the three-dimensional image together with each other; and a control unit configured to determine a correction value for stereoscopic effect of an object of the three-dimensional image based on an operation detected by the operating unit, correct a position of the object in at least one of the plurality of images that form the three-dimensional image based on the correction value for the stereoscopic effect of the object, and superpose the plurality of images including the corrected image on the display unit to display the object as a three-dimensional image.

According to another aspect, the three-dimensional image includes a plurality of objects.

According to another aspect, the control unit is configured to, based on the correction value for the stereoscopic effect of the object, increase a disparity of the object between the plurality of images when the stereoscopic effect is enhanced, and decreases a disparity of the object between the plurality of images when the stereoscopic effect is suppressed.

According to another aspect, the control unit is configured to adjust the disparity within a range in which an antero-posterior relation between the plurality of objects is not reversed.

According to another aspect, the control unit is configured to determine a range of the correction value that can be set based on distances between the plurality of objects.

According to another aspect, the electronic device further includes an imaging unit for capturing images that can be displayed as a three-dimensional image, and the control unit is configured to acquire distance information from the imaging unit to the object when the imaging unit captures a three-dimensional image.

According to another aspect, the imaging unit includes two cameras that are separated with a predetermined interval, and the control unit is configured to analyze images respectively captured by the two cameras, and acquire distance information from each of the two camera to the object based on a disparity between the two images respectively captured by the two cameras According to another aspect, the imaging unit includes a focus-position adjustment mechanism, and the control unit is configured to analyze focal distance information acquired by moving a focus position using the focus-position adjustment mechanism when the images are captured, and acquire distance information from the imaging unit to the object.

ADVANTAGEOUS EFFECTS OF INVENTION

According to one aspect of the electronic device according to the present invention, the electronic device can appropriately display a three-dimensional image.

DESCRIPTION OF EMBODIMENTS

The aspects of the present invention will be explained in detail below with reference to the drawings. It should be noted that the present invention is not limited by the following explanation. In addition, the components in the explanation below include those which are easily conceived by persons skilled in the art, those which are substantially identical thereto, and those in a scope of so-called equivalents. In the following, a mobile phone is used for explanation as an example of an electronic device; however, a target to which the present invention is applied is not limited to the mobile phones. Therefore, the present invention is also applicable to various devices provided having a three-dimensional (3D) image display function, for example, PHSs (Personal Handy-phone Systems), PDAs, portable navigation devices, personal computers, and gaming devices. Moreover, regarding the electronic devices having only display function of the three-dimensional (3D) image, the present invention can be used not only for mobile electronic devices but for various stationary type devices such as TVs and monitors.

Figure 1:
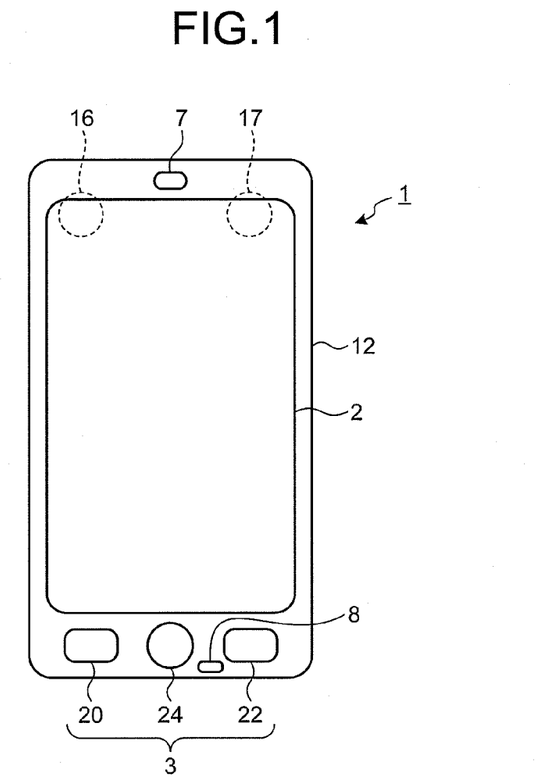
FIG. 1 is a front view illustrating an appearance of a mobile phone according to an embodiment.

FIG. 1 is a front view illustrating an appearance of a mobile phone according to an embodiment. A mobile phone 1 has a thin plate-like housing 12. The mobile phone 1 includes a touch panel 2; an input unit 3 including a button 20, a button 22, and an input device 24; a receiver 7; a microphone 8; a first camera 16; and a second camera 17, which are arranged on the surface of the housing 12. The touch panel 2 is provided on a face with the widest area of the plate-like housing 12. The input unit 3 is also disposed along one end of the face of the housing 12, in its long-side direction, where the touch panel 2 is provided. The button 20, the input device 24, and the button 22 are arranged in the input unit 3 in this order from one end toward the other end in its short-side direction. The receiver 7 is disposed at the other end of the face of the housing 12, in the long-side direction, where the touch panel 2 is provided, i.e., at the opposite end to the end where the input unit 3 is disposed. The microphone 8 is disposed at one end of the face of the housing 12, in the long-side direction, where the touch panel 2 is provided, i.e., at the end where the input unit 3 is disposed. The first camera 16 and the second camera 17 are disposed in a face on the opposite side to the face where the touch panel 2 is provided. The first camera 16 and the second camera 17 are arranged at positions with a predetermined distance between each other. In the direction illustrated in FIG. 1, i.e., in the direction when the user views the mobile phone 1 from the touch panel 2 side, the first camera 16 functions as a camera on the left side and the second camera 17 functions as a camera on the right side. In the present embodiment, the first camera 16 and the second camera 17 constitute the imaging unit.

The touch panel 2 displays characters, graphics, images, and the like, and detects any of various gestures performed on the touch panel 2 using a finger, a stylus, a pen (a tip of a pen, a tip of a stick-like member) or so (hereinafter, "finger"). For example, in order to accept an input of a character from the user, the mobile phone 1 displays a virtual keyboard on the touch panel 2. While displaying the virtual keyboard on the touch panel 2, the mobile phone 1 detects various gestures input to the touch panel 2 with a finger, detects which key of the virtual keyboard is pressed or touched, and determines that the key detected as being pressed or touched is a key used for the input, so that a character input can be performed. The touch panel 2 detects an input of various operations based on a displayed image and various gestures performed on the touch panel 2 with the finger other than the input of the character, and provides various controls based on the input operation.

When the button 20 or 22 is pressed, the input unit 3 activates a function corresponding to the pressed button. The input unit 3 also detects a gesture input to the input device 24 as an operation, and performs various controls based on the input operation. For example, the input device 24 detects a direction indication operation and a determination operation. The input device 24 is formed from a touch pad, an optical input device, or an input device that includes buttons in four directions and at a central portion, or the like.

Figure 2:
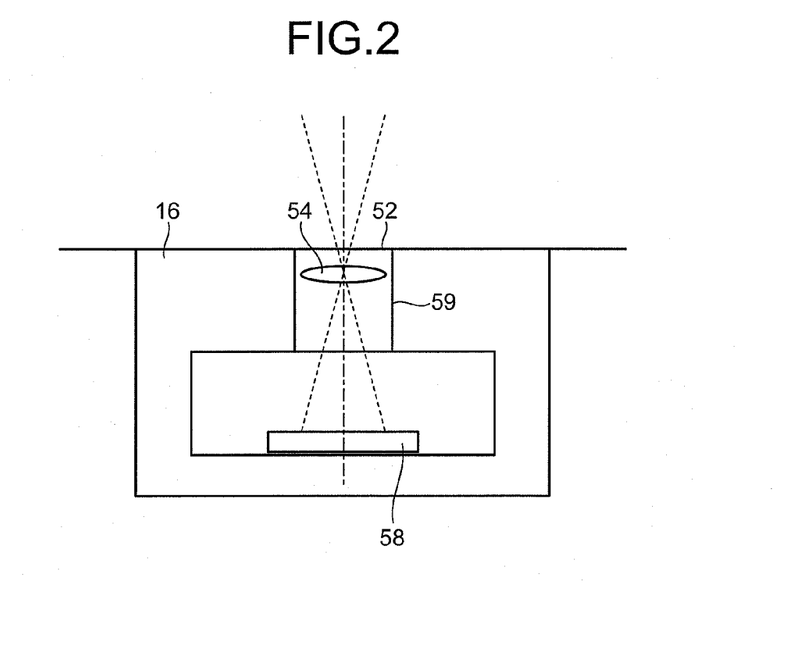
FIG. 2 is an explanatory diagram illustrating a schematic configuration of a first camera.

The first camera 16 and the second camera 17 are imaging devices for capturing images. The first camera 16 and the second camera 17 have basically the same configuration as each other except that their positions to be arranged are different. The configuration of the first camera 16 as a typical one of them will be explained below. The first camera 16 is an imaging device for capturing an image, and includes, as illustrated in FIG. 2, a capture window 52, an optical system 54, a light-receiving unit 58, and a focus-position adjustment mechanism 59. The capture window 52 is arranged to be exposed on the face of the housing 12 opposite to the face where the touch panel 2 is provided. The capture window 52 is formed of a transparent member, and allows light incident from external light on the housing 12 to enter (to be guided to) the inside thereof. The optical system 54 is formed from an optical member such as a lens for guiding the light entered from the capture window 52 into the inside of the housing 12 to the light-receiving unit 58. The optical system 54 selectively guides the light entered from a predetermined angle range (capture area), of the light entered from the capture window 52, to the light-receiving unit 58. The light-receiving unit 58 is a device for acquiring image information for the capture area, and includes an imaging element (CMOS image sensor, CCD image sensor, etc.) with photodiodes arranged in a matrix on its light-receiving surface. When an image is formed on the light-receiving surface, the light-receiving unit 58 reads the formed image by the imaging element and converts the read image into image information being electronic data. The focus-position adjustment mechanism 59 adjusts a relative position of the optical system 54 and adjusts a distance to a subject (object) of which an image is formed on the light-receiving unit 58, of the light incident from the capture window 52 on the light-receiving unit 58. That is, the focus-position adjustment mechanism 59 adjusts a focus position. The focus-position adjustment mechanism 59 is formed from a mechanism for adjusting a position of at least one lens of the optical system 54, a mechanism for adjusting the relative position of the whole of the optical system 54, or the like.

The first camera 16 is configured in the above manner, and acquires an image in the capture area by guiding the light in the capture area incident from the capture window 52 to the light-receiving unit 58 through the optical system 54 and reading the light as the image formed on the light-receiving unit 58. The first camera 16 can adjust a focus position using the focus-position adjustment mechanism 59. While changing the focus positions using the focus-position adjustment mechanism 59, the first camera 16 acquires an image at each focus position to determine an appropriate focus position, thereby implementing an auto-focus function. The first camera 16 also includes a zoom function in addition to these functions.

Figure 3:
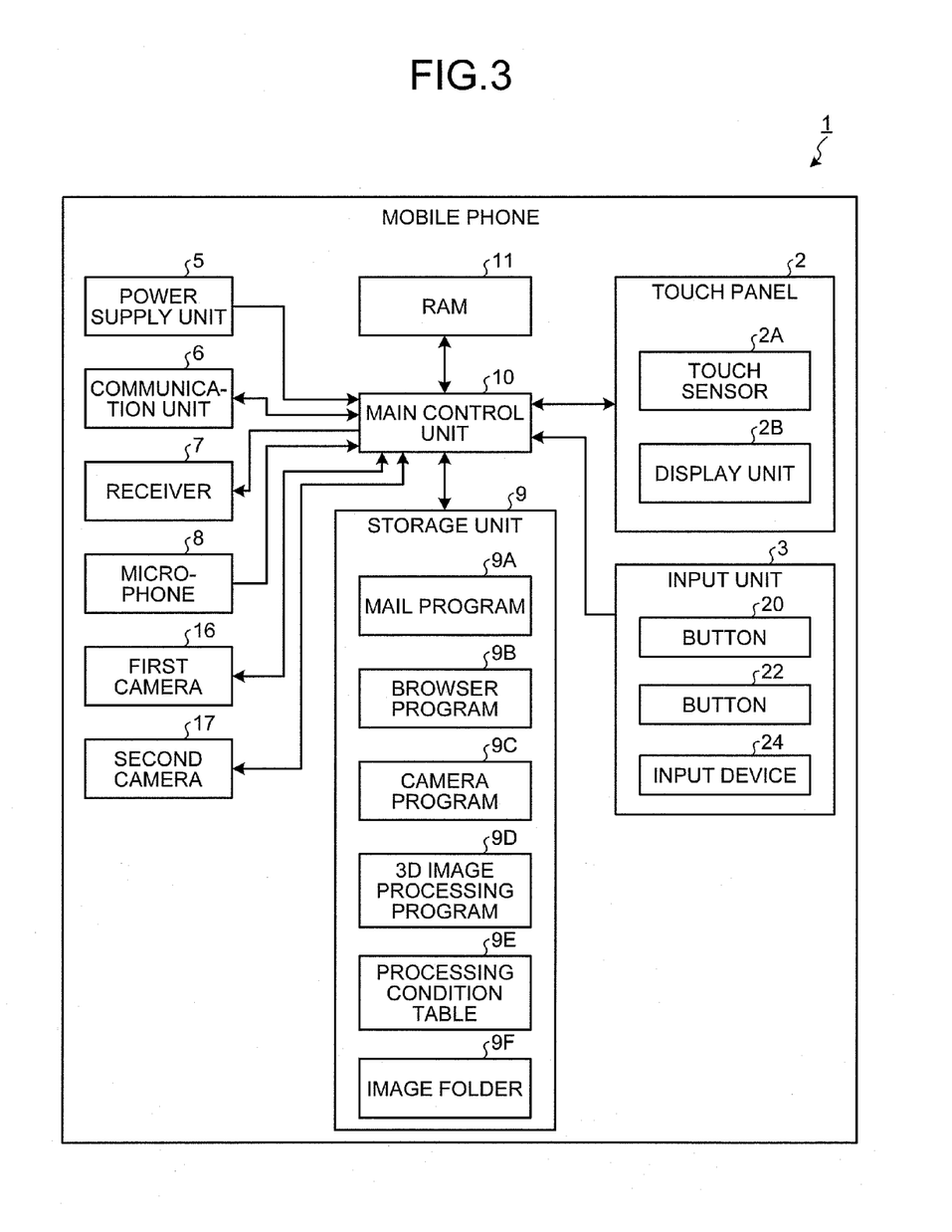
FIG. 3 is a block diagram illustrating a schematic configuration of functions of the mobile phone illustrated in FIG. 1.

Then a relation between the functions and the control unit of the mobile phone 1 will be explained below. FIG. 3 is a block diagram illustrating a schematic configuration of the functions of the mobile phone 1 illustrated in FIG. 1. As illustrated in FIG. 3, the mobile phone 1 includes the touch panel 2, the input unit 3, a power supply unit 5, a communication unit 6, the receiver 7, the microphone 8, a storage unit 9, a main control unit 10, RAM (Random Access Memory) 11, the first camera 16, and the second camera 17.

The touch panel 2 includes a display unit 2B and a touch sensor 2A placed over the display unit 2B. The touch sensor 2A detects various gestures performed on the touch panel 2 using a finger as well as positions on the touch panel 2 where the gestures are performed. The gestures detected by the touch sensor 2A include a gesture of bringing a finger into contact with the surface of the touch panel 2, a gesture of moving a finger while keeping the finger in contact with the surface of the touch panel 2, and a gesture of removing a finger from the surface of the touch panel 2. Any one of detection methods such as a pressure sensitive type and a capacitive type may be used as the detection method of the touch sensor 2A. The display unit 2B is formed with, for example, an LCD (Liquid Crystal Display) or an OEL (Organic Electro-Luminescence) panel, and displays text, graphics, images, and so on. The display unit 2B displays a plurality of images on each other in a superposed manner to display a three-dimensional (3D) image, i.e., an image that can be three-dimensionally viewed by the user. In other words, the display unit 2B can display a three-dimensional (3D) image by displaying a plurality of images in a superposed manner.

As explained above, the input unit 3 includes the buttons 20, 22, and the input device 24. The buttons 20 and 22 accept a user operation through a physical input (depression) and transmit a signal corresponding to the accepted operation to the main control unit 10. The input device 24 also accepts a user operation and transmits a signal corresponding to the accepted operation to the main control unit 10.

The power supply unit 5 supplies electric power obtained from a battery or an external power supply to each of function units of the mobile phone 1 including the main control unit 10. The communication unit 6 establishes a wireless signal path using a CDMA system or so with a base station via a channel allocated by the base station, and performs telephone communication and information communication with the base station. The receiver 7 outputs the voice of the other party on the telephone communication, a ring tone, and the like. The microphone 8 converts the voice of the user or the like to electrical signals.

The storage unit 9 is, for example, a nonvolatile memory or a magnetic storage device, and stores therein programs and data used for processes performed by the main control unit 10. Specifically, the storage unit 9 stores therein a mail program 9A for transmitting, receiving and browsing mail, a browser program 9B for browsing Web pages, a camera program 9C for capturing an image using the first camera 16, a 3D (three-dimensional) image processing program 9D for capturing images that can be displayed as a 3D (three-dimensional) image and for displaying the 3D image, a processing condition table 9F associated with various conditions used for executing the various programs, and an image folder 9F for storing therein images acquired through capturing or the like. The storage unit 9 also stores therein an operating system program for performing basic functions of the mobile phone 1, and other programs and data such as address book data in which names, telephone numbers, mail addresses, and the like are registered. The storage unit 9 further stores therein programs for determining a control operation and process based on an input operation input to the touch panel 2. The control operation and process include various operations and processes performed by the mobile phone 1, which are, for example, a movement of a cursor and a pointer, a change of screen display, a character input process, and an activation process and an end process of various applications. The image folder 9F stores a plurality of image data capable of being displayed as a three-dimensional image in combination of a plurality of images thereof. The image data capable of being displayed as a three-dimensional image is associated with distance information (distance information between each subject and the capture position) for the subjects (objects) included in the image.

The main control unit 10 is, for example, a CPU (Central Processing Unit), and integrally controls the operations of the mobile phone 1. Specifically, the main control unit 10 executes the programs stored in the storage unit 9 while referring to the data stored in the storage unit 9 as necessary to execute the various processes by controlling the touch panel 2, the input unit 3, the communication unit 6, the first camera 16, the second camera 17, and the like. The main control unit 10 loads the programs stored in the storage unit 9 and data, which is acquired, generated, or processed by executing the processes, to the RAM 11 providing a temporary storage area as necessary. The programs to be executed and the data to be referred to by the main control unit 10 may be downloaded from a server through wireless communication by the communication unit 6.

Each of the first camera 16 and the second camera 17 is an imaging mechanism in which the capture window 52 for capturing an image is arranged to be exposed from the housing 12, and that acquires an image in a capture area.

Figure 4:
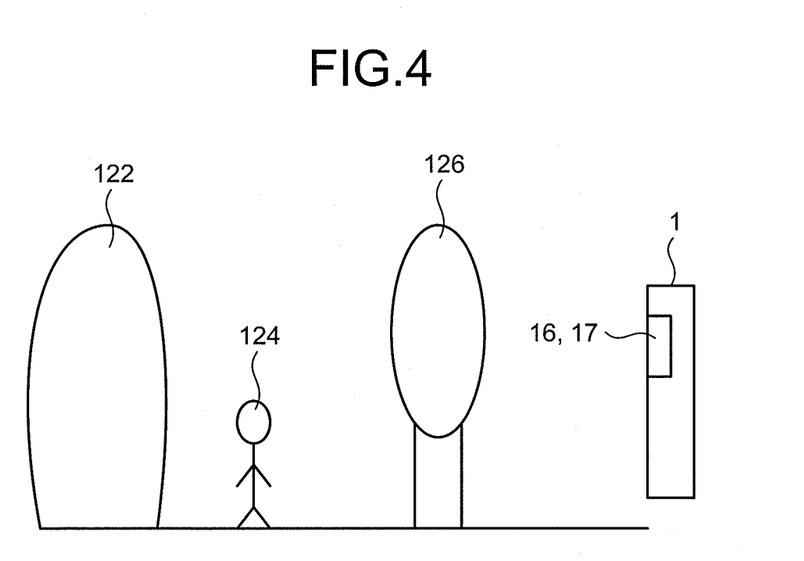
FIG. 4 is an explanatory diagram for explaining a relation between the mobile phone and subjects.
Figure 5:
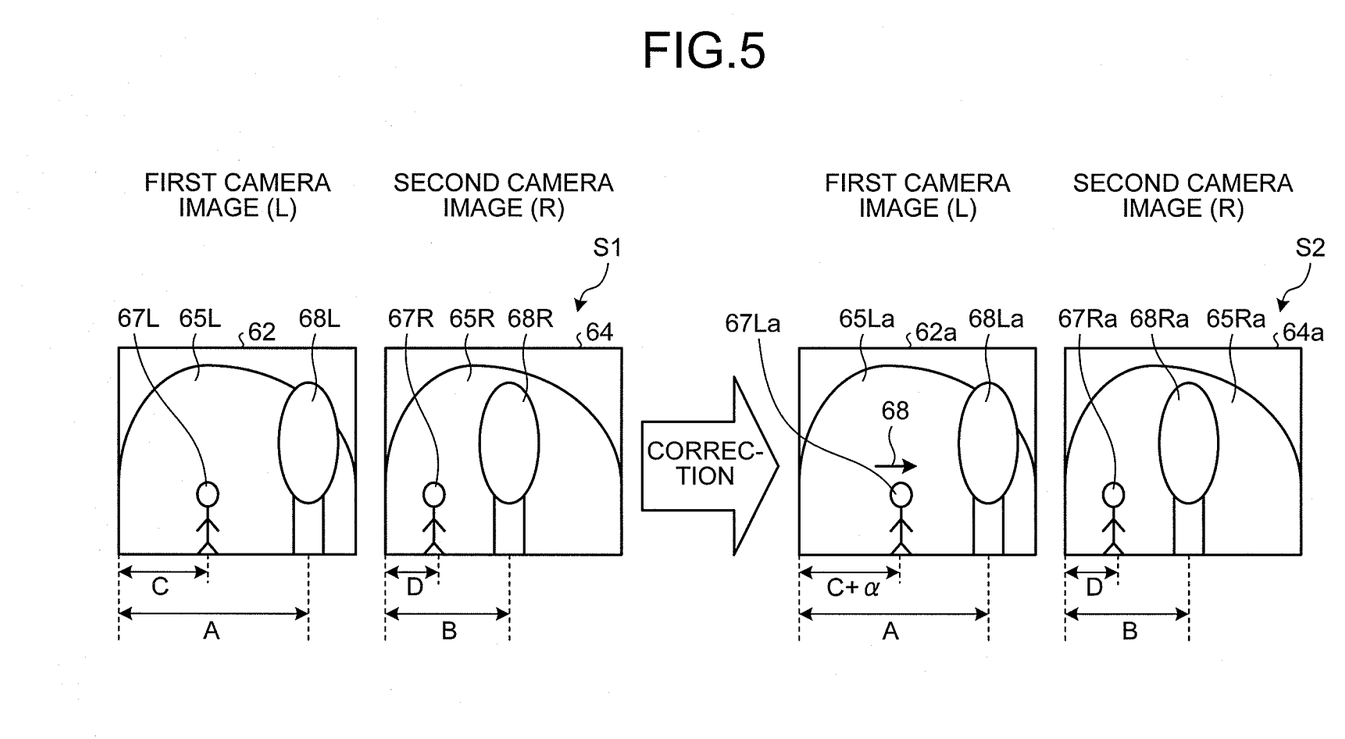
FIG. 5 is an explanatory diagram for explaining an image correction process of the mobile phone.
Figure 6:
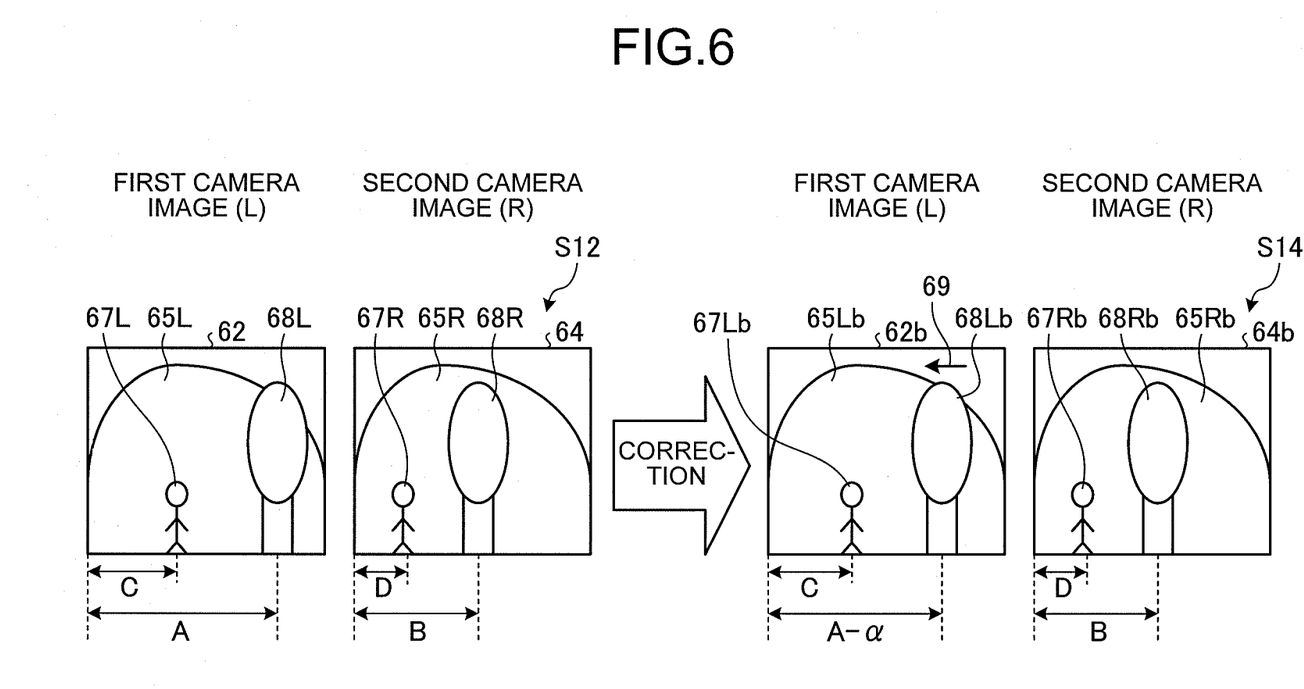
FIG. 6 is an explanatory diagram for explaining an image correction process of the mobile phone.

Then an example of a process for correcting images that can be displayed as a three-dimensional image will be explained below with reference to FIG. 4 to FIG. 6. FIG. 4 is an explanatory diagram for explaining a relation between the mobile phone and subjects. FIG. 5 and FIG. 6 are explanatory diagrams for explaining image correction processes of the mobile phone. The processes illustrated in FIG. 5 and FIG. 6 are examples of the process for correcting images that are captured by the mobile phone 1 and can be displayed as a three-dimensional image. The processes illustrated in FIG. 5 and FIG. 6 are executed by the functions provided by the camera program 9C and the 3D image processing program 9D. More specifically, the images acquired by the function (image capture function) provided by the camera program 9C are analyzed based on the function provided by the 3D image processing program 9D to correct the images that can be displayed as a three-dimensional image based on a correction value input by the user. The processes of the programs are performed by the main control unit 10.

In the present embodiment, a case in which the mobile phone 1 captures images that include a mountain 122, a person 124, and a tree 126 as subjects as illustrated in FIG. 4 and that can be displayed as a three-dimensional image will be explained below. The mountain 122, the person 124, and the tree 126 that are subjects are positioned such that the mountain 122 is located at a farthest position from the mobile phone 1, the person 124 is located before the mountain 122 (on the side nearer to the mobile phone 1 than the mountain 122), and the tree 126 is located before the person 124.

When capturing is performed at the positional relation illustrated in FIG. 4, the mobile phone 1 acquires an image 62 using the first camera 16 and acquires an image 64 using the second camera 17, as illustrated at Step S1 of FIG. 5. The image 62 captured by the first camera 16 is a left-eye image, which includes a mountain 65L, a person 67L, and a tree 68L as subjects. The image 64 captured by the second camera 17 is a right-eye image, which includes a mountain 65R, a person 67R, and a tree 68R as subjects. Capture positions of the image 62 and the image 64 are displaced from each other, and therefore the two images differ in the positions of the subjects. Specifically, in the image 62, the position of the tree 68L is a position with a distance A away from the left edge of the image. On the other hand, in the image 64, the position of the tree 68R is a position with a distance B away from the left edge of the image. A relation between the distance A and the distance B satisfies B<A. In the image 62, the position of the person 67L is a position with a distance C away from the left edge of the image. On the other hand, in the image 64, the position of the person 67R is a position with a distance D away from the left edge of the image. A relation between the distance C and the distance D satisfies D<C. In this way, by acquiring the two images of the image 62 and the image 64 having disparity therebetween, the images capable of being displayed as a three-dimensional image can be captured. Moreover, the mobile phone 1 acquires distance information (distance from the mobile phone 1, depth information) of a subject included in the three-dimensional image based on the disparity between the two images, i.e., the displacement between the positions of the subjects in the image 62 and the image 64. This enables the mobile phone 1 to detect an anteroposterior relation of the subjects. The mobile phone 1 has only to recognize the anteroposterior relation of the subjects or the distance to each of the subjects with a certain degree of precision, and therefore the distance to each of the subjects is not necessarily detected with high precision. The mobile phone 1 can also acquire distance information from each of the first camera 16 and the second camera 17 to each of the subjects.

In the three-dimensional image obtained by displaying the two images of the image 62 and the image 64 of Step S1 in a superposed manner, the disparity of the tree 126 is A−B and the disparity of the person 124 is C−D. A relation between the disparities of the two subjects satisfies (A−B)>(C−D), and the disparity of the tree 126 is larger than the disparity of the person 124. Thus, the three-dimensional image becomes such that the tree 126 looks more three-dimensionally than the person 124. In other words, the three-dimensional image in which the tree 126 located nearer to the mobile phone 1 has more stereoscopic effect is displayed.

When the images illustrated at Step S1 of FIG. 5 are acquired and then an operation of correcting the stereoscopic effect of a subject is input by the user, the mobile phone 1 corrects the acquired images based on the input operation. For example, when the user inputs an operation of correction to enhance the stereoscopic effect of the person 124 among the subjects, i.e., correction to display the person 124 more three-dimensionally, the mobile phone 1 performs a correction process of moving a person 67La in an image 62a in a direction of arrow 68 (rightward in the screen) as illustrated at Step S2. A mountain 65La and a tree 68La as other subjects in the image 62a are not changed from the image 62. Thus, in the image 62a, the position of the person 67La is a position with a distance C+α away from the left edge of the image. Regarding the area where the person 67L is displayed in the image 62 and the person 67La does not appear in the image 62a caused by moving the person 67La by α, the mobile phone 1 can fill the image by complementing the image. At Step S2 of FIG. 5, although the position of the person 67La is largely moved for the sake of easy understanding, the movement is made within a very short distance in an actual process, and therefore by performing the process of complementing the image, an image with less sense of incongruity can be obtained. An image 64a is not changed from the image 64. In other words, a mountain 65Ra, a person 67Ra, and a tree 68Ra in the image 64a remain the same as the mountain 65R, the person 67R, and the tree 68R in the image 64.

In the three-dimensional image obtained by displaying the two images of the image 62a and the image 64a of Step S2 in a superposed manner, a disparity of the tree 126 is A−B and a disparity of the person 124 is C+α−D. A relation between the disparities of the two subjects satisfies (A−B)>((C+a)−D), and the disparity of the tree 126 is larger than the disparity of the person 124. In this way, the three-dimensional image obtained by displaying the image 62a and the image 64a in a superposed manner is also displayed as a three-dimensional image in which the tree 126 located nearer to the mobile phone 1 than the person 124 has more stereoscopic effect. In the three-dimensional image obtained by displaying the image 62a and the image 64a in a superposed manner, the disparity of the person 124 is increased by α. This makes it possible to obtain a three-dimensional image in which the stereoscopic effect of the person 124 is more enhanced.

Then another correction process will be explained below with reference to FIG. 6. When capturing is performed at the positional relation illustrated in FIG. 4, the mobile phone 1 acquires the image 62 using the first camera 16 and acquires the image 64 using the second camera 17, as illustrated at Step S12 of FIG. 6. The images of Step S12 are the same as those of Step S1. The image 62 captured by the first camera 16 is the left-eye image, which includes the mountain 65L, the person 67L, and the tree 68L as the subjects. The image 64 captured by the second camera 17 is the right-eye image, which includes the mountain 65R, the person 67R, and the tree 68R as the subjects. The respective distances of the subjects from the left edge are as described above.

When the images illustrated at Step S12 of FIG. 6 are acquired and then an operation of correcting the stereoscopic effect of a subject is input by the user, the mobile phone 1 corrects the acquired images based on the input operation. For example, when the user inputs an operation of correction to suppress the stereoscopic effect of the tree 126 among the subjects, i.e., an operation of correcting the tree 126 so as to be displayed more two-dimensionally, the mobile phone 1 performs a correction process of moving a tree 68Lb in an image 62b in a direction of arrow 69 (leftward in the screen) as illustrated at Step S14. A mountain 65Lb and a person 67Lb as other subjects in the image 62b are not changed from the image 62. Thus, in the image 62b, the position of the tree 68Lb is a position with a distance A−α away from the left edge of the image. Regarding the area where the tree 68L is displayed in the image 62 and the tree 68Lb does not appear in the image 62b caused by moving the tree 68Lb by α, the mobile phone 1 can fill the image by complementing the image. An image 64b is not changed from the image 64. In other words, a mountain 65Rb, a person 67Rb, and a tree 68Rb in the image 64b remain the same as the mountain 65R, the person 67R, and the tree 68R in the image 64.

In the three-dimensional image obtained by displaying the two images of the image 62b and the image 64b of Step S14 in a superposed manner, a disparity of the tree 126 is (A−α)−B and a disparity of the person 124 is C−D. A relation between the disparities of the two subjects satisfies ((A−α)−B)>(C−D), and the disparity of the tree 126 is larger than the disparity of the person 124. In this way, the three-dimensional image obtained by displaying the image 62*b* and the image 64*b* in a superposed manner is also displayed as a three-dimensional image in which the tree 126 located nearer to the mobile phone 1 has more stereoscopic effect. In the three-dimensional image obtained by displaying the image 62*b* and the image 64*b* in a superposed manner, the disparity of the tree 126 is reduced by α. This makes it possible to obtain a three-dimensional image in which the stereoscopic effect of the tree 126 is more suppressed.

In this way, by correcting the stereoscopic effect of the subject indicated by the user based on the correction value indicated by the user, the mobile phone 1 can display the three-dimensional image with stereoscopic effect which is desired by the user. Specifically, the mobile phone 1 moves the position of a subject indicated by the user in at least one of a plurality of images that form the three-dimensional image to adjust disparity between the images (displacement between positions). In this way, the mobile phone 1 corrects the position of only the specified subject and corrects the disparity thereof, to thereby enable adjustment of the stereoscopic effect of only the subject selected from among a plurality of subjects that form the three-dimensional image. Thus, the user can adjust the stereoscopic effect of each subject to display a three-dimensional image with desired stereoscopic effect. In addition, because it is possible to suppress a change in the stereoscopic effect of a subject that does not require adjustment, the three-dimensional image can be made easy to view.

To enhance the stereoscopic effect based on the correction value for the stereoscopic effect of a subject, the main control unit 10 of the mobile phone 1 preferably increases the disparity of the subject between a plurality of images. To suppress the stereoscopic effect, the main control unit 10 preferably decreases the disparity of the subject between the images when the stereoscopic effect is suppressed. Thus, the stereoscopic effect of the subject as a target can be appropriately adjusted.

The main control unit 10 preferably adjusts the disparity, i.e., the stereoscopic effect in a range in which the anteroposterior relation between detected subjects is not reversed. In this way, by limiting the amount of adjustment of the disparity, it is possible to prevent an image whose anteroposterior relation is reversed to an actual image and to prevent a display of a three-dimensional image that causes unnecessary sense of incongruity. The main control unit 10 acquires distance information for each of the subjects to be stored in the storage unit 9 and adjusts the stereoscopic effect based on the information, thereby performing the above-mentioned processes. Thus, the distance information for each of the subjects is preferably acquired and stored in the storage unit 9; however, the embodiment is not limited thereto. The distance information for a subject can be calculated each time by analyzing the images. The mobile phone 1 can adjust the stereoscopic effect even when adjusting the disparity without taking the distance information into consideration.

The main control unit 10 according to the embodiment is configured to set a change amount of the disparity, i.e., a correction amount to a constant value α; however, the correction amount is not limited thereto. The correction amount may be any value the user can arbitrarily set or may be a constant amount (preset value). The correction amount may be changed gradually (in a step-by-step manner) by repeating the correction process. The mobile phone 1 may cause the user to input a correction value as it is and the main control unit 10 to determine the input value as the correction value, or may cause the user to input a predetermined instruction and the main control unit 10 to determine the correction value based on the input operation.

The embodiment has explained the case where stereoscopic effect of only one of the subjects that form a three-dimensional image is corrected; however, the embodiment is not limited thereto. The mobile phone 1 may correct respective stereoscopic effects of the plural subjects in association with each other.

In the embodiment, two images are used to display a three-dimensional image; however, more pieces of images may be used to display a three-dimensional image. In this case, the mobile phone 1 captures images at required relative positions by the corresponding number, thereby capturing a three-dimensional image formed with a plurality of pieces of image data.

Figure 7:
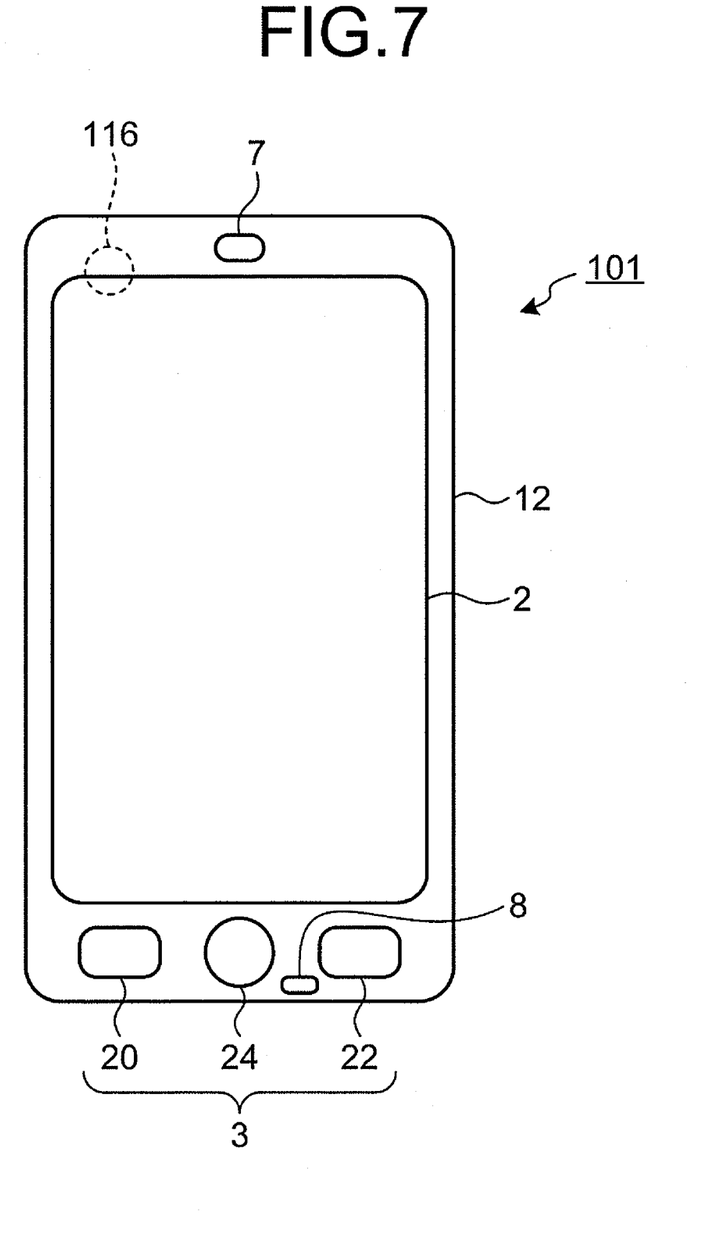
FIG. 7 is a front view illustrating an appearance of a mobile phone according to another embodiment.
Figure 8:
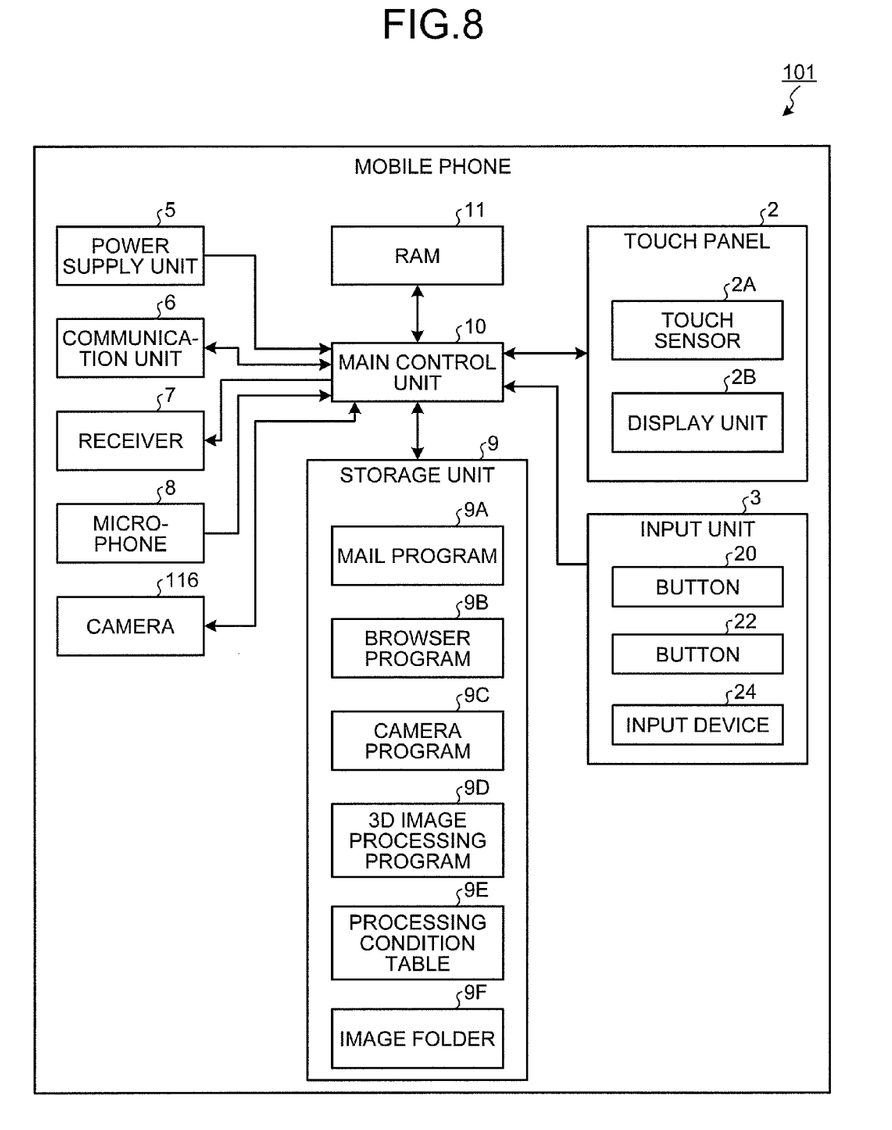
FIG. 8 is a block diagram illustrating a schematic configuration of functions of the mobile phone illustrated in FIG. 7.

Then another embodiment of the mobile phone will be explained below with reference to FIG. 7 and FIG. 8. FIG. 7 is a front view illustrating an appearance of another embodiment of the mobile phone. FIG. 8 is a block diagram illustrating a schematic configuration of functions of the mobile phone illustrated in FIG. 7. A mobile phone 101 illustrated in FIG. 7 and FIG. 8 has an imaging unit constituted by one camera and, except for that, other configurations that are the same as those of the mobile phone 1 illustrated in FIG. 1 to FIG. 3. Specific features of the mobile phone 101 will be mainly explained below.

The mobile phone 101 has the thin plate-like housing 12. The mobile phone 101 includes the touch panel 2; the input unit 3 including the button 20, the button 22, and the input device 24; the receiver 7; the microphone 8; and a camera 116, which are arranged on the surface of the housing 12. The camera 116 is disposed in a face on the opposite side to the face where the touch panel 2 is provided. The camera 116 is disposed at the same position as that of the first camera 16. As illustrated in FIG. 8, the mobile phone 101 includes the touch panel 2, the input unit 3, the power supply unit 5, the communication unit 6, the receiver 7, the microphone 8, the storage unit 9, the main control unit 10, the RAM (Random Access Memory) 11, and the camera 116. The various programs and data stored in the storage unit 9 of the mobile phone 101 are basically the same as above. However, the camera program 9C and the 3D image processing program 9D are configured to capture and display images that can be displayed as a three-dimensional image by the process different from that of the mobile phone 1 to cope with the fact that the imaging unit is provided with only the camera 116.

Figure 9:
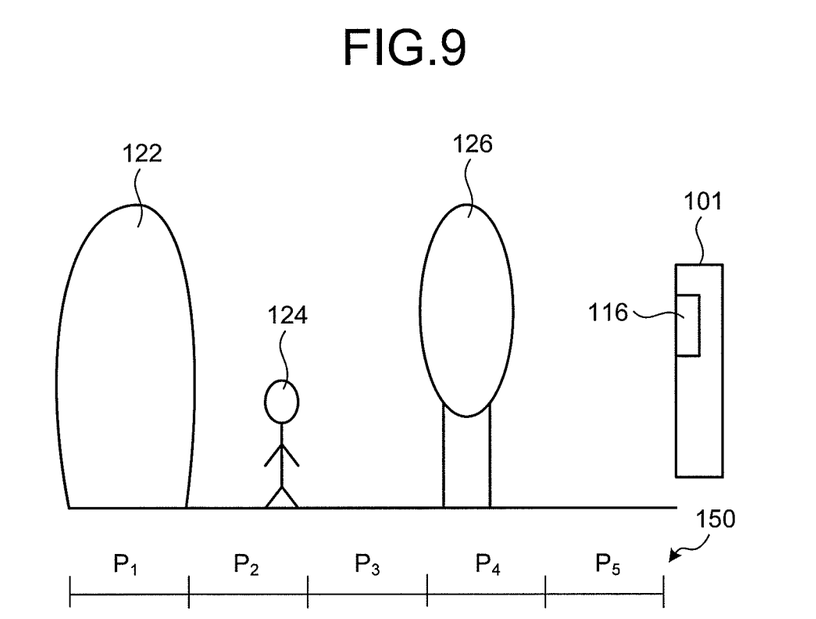
FIG. 9 is an explanatory diagram for explaining a relation between the mobile phone and the subjects.
Figure 10:
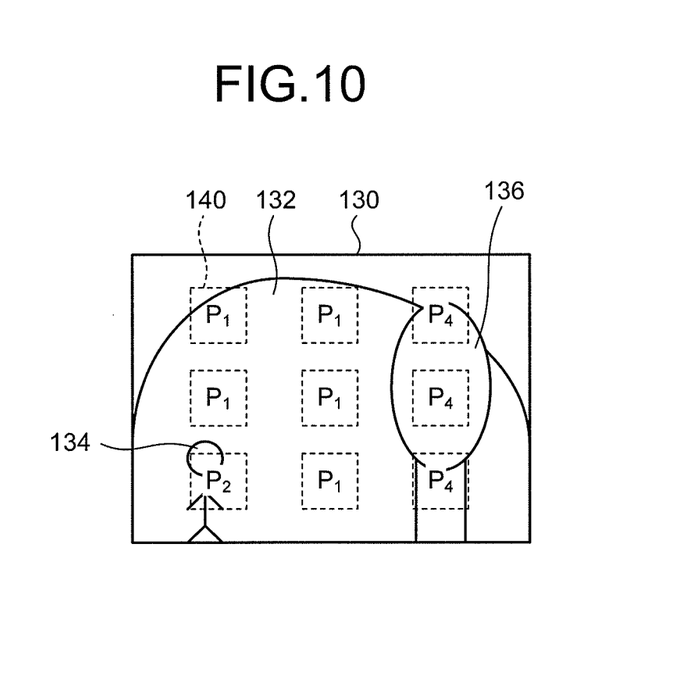
FIG. 10 is an explanatory diagram for explaining a three-dimensional-image creation process of the mobile phone.
Figure 11:
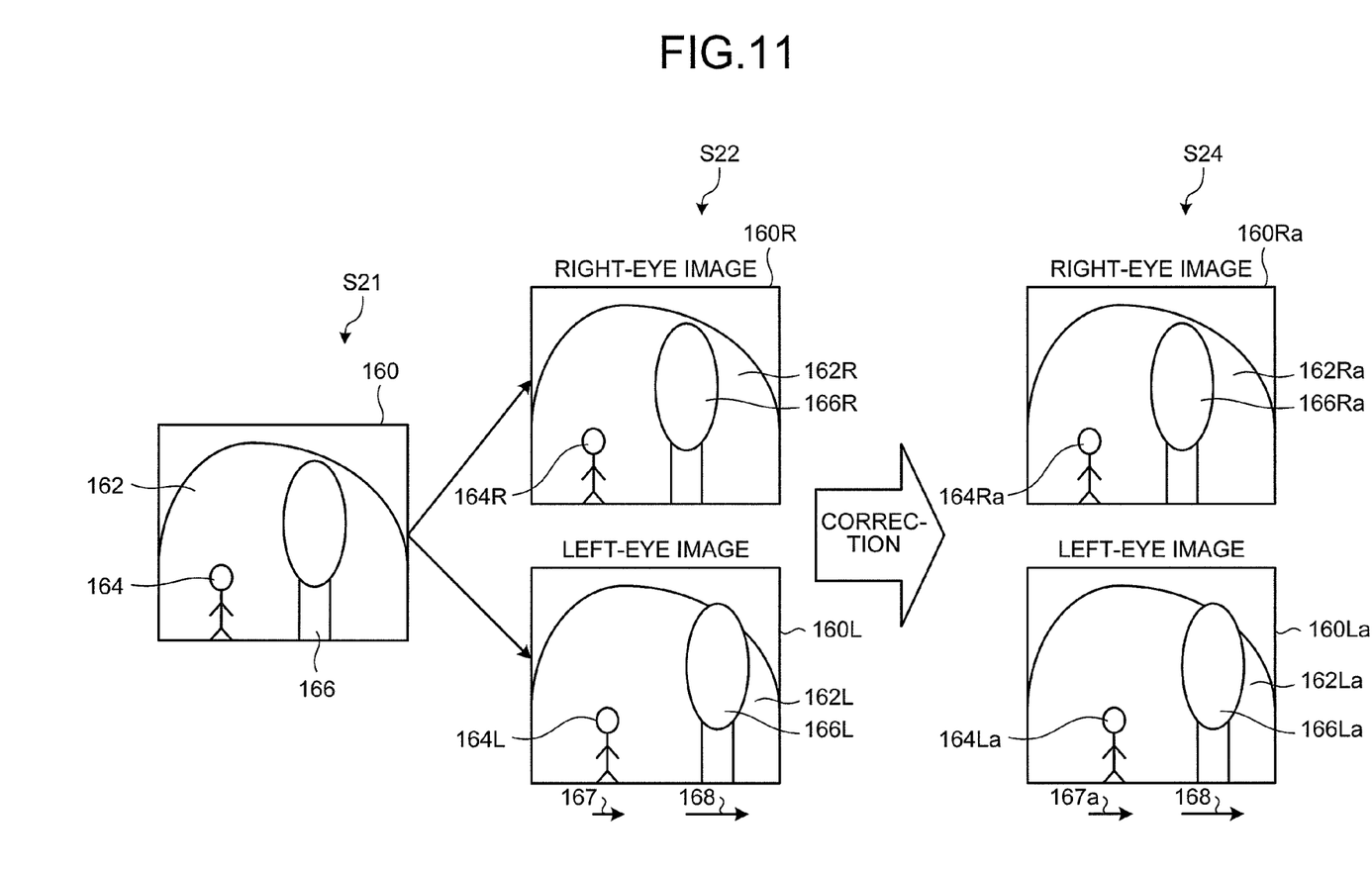
FIG. 11 is an explanatory diagram for explaining an image correction process of the mobile phone.

Examples of a capture process and a correction process of images that can be displayed as a three-dimensional image will be explained below with reference to FIG. 9 to FIG. 11. FIG. 9 is an explanatory diagram for explaining a relation between the mobile phone and the subjects. FIG. 10 is an explanatory diagram for explaining a three-dimensional-image creation process of the mobile phone. FIG. 11 is an explanatory diagram for explaining an image correction process of the mobile phone. The processes illustrated in FIG. 9 to FIG. 11 are executed by the functions provided by the camera program 9C and the 3D image processing program 9D. More specifically, the images acquired by the function (image capture function) provided by the camera program 9C are analyzed based on the function provided by the 3D image processing program 9D to correct the images that can be displayed as a three-dimensional image based on a correction value input by the user. The processes of the programs are performed by the main control unit 10.

In the present embodiment, also, a case in which the mobile phone 101 captures images that include the mountain 122, the person 124, and the tree 126 as the subjects as illustrated in FIG. 9 and that can be displayed as a three-dimensional image will be explained below. The mountain 122, the person 124, and the tree 126 that are subjects are positioned such that the mountain 122 is located at a farthest position from the mobile phone 101, the person 124 is located at a place before the mountain 122 (on the side nearer to the mobile phone 101 than the mountain 122), and the tree 126 is located before the person 124. The mobile phone 101 sets herein a parameter 150 based on a range of each distance from itself. The parameter 150 is set based on each focal distance (distance to each subject) and is set as a parameter $P_1$, a parameter $P_2$, a parameter $P_3$, a parameter $P_4$, and a parameter $P_5$ in order from a farther focal distance. The range nearest in focal distance corresponds to the parameter $P_5$. The mountain 122 is in the range of the parameter $P_1$. The person 124 is in the range of the parameter $P_2$. The tree 126 is in the range of the parameter $P_4$.

When capturing is performed at the positional relation illustrated in FIG. 9, the mobile phone 101 acquires an image 130 as illustrated in FIG. 10. The image 130 includes a mountain 132, a person 134, and a tree 136 as subjects. Upon capture of the image 130, the mobile phone 101 acquires images while changing focus position using the focus-position adjustment mechanism 59, and analyzes the acquired images to calculate a focal distance of each of the subjects. In the present embodiment, the focal distances are calculated in nine measurement areas 140 of the image 130. The mobile phone 101 determines a parameter associated with a focal distance of each of the measurement areas 140 based on the focal distances calculated in the measurement areas 140. The mobile phone 101 determines a parameter to be associated with each of the subjects based on the parameter associated with each of the measurement areas 140 and the structure of the subjects. Specifically, the mobile phone 101 associates the mountain 132 as a subject with the parameter $P_1$ based on the fact that measurement areas 140 where the mountain 132 appears are set as the parameter $P_1$, associates the person 134 as a subject with the parameter $P_2$ based on the fact that a measurement area 140 (the measurement area 140 at the lower left) where the person 134 appears is set as the parameter $P_2$, and associates the tree 136 as a subject with the parameter $P_4$ based on the fact that measurement areas 140 (three measurement areas 140 on the right side) where the tree 136 appears are set as the parameter $P_4$. In this way, the mobile phone 101 uses the auto-focus function that uses the focus-position adjustment mechanism 59 to determine the parameters of the subjects. The positions and structure of the subjects included in the image can be detected by analysis using technologies such as image analysis, contour detection, face recognition, and pattern matching.

The correction process will be explained below. As illustrated at Step S21 of FIG. 11, the mobile phone 101 acquires an image 160 using the camera 116. The image 160 is the same as the image 130. The image 160 includes a mountain 162, a person 164, and a tree 166 as subjects. At Step S22, the main control unit 10 of the mobile phone 101 creates a right-eye image 160R and a left-eye image 160L from captured image 160. In the present embodiment, the right-eye image 160R is set as a reference image, and is the same as the image 160. The right-eye image 160R includes a mountain 162R, a person 164R, and a tree 166R as subjects, and the respective positions of the subjects are the same as those of the image 160. The left-eye image 160L includes a mountain 162L, a person 164L, and a tree 166L as subjects. The mobile phone 101 corrects the respective positions of the subjects in the left-eye image 160L based on the parameters of the subjects. Specifically, the person 164L is moved by a distance corresponding to the parameter $P_2$ in a direction of arrow 167 (rightward in the figure) with respect to the position of the person 164 in the image 160. The tree 166L is moved by a distance corresponding to the parameter $P_4$ in a direction of arrow 168 (rightward in the figure) with respect to the position of the tree 166 in the image 160. The mobile phone 101 sets a movement distance of the subject with the parameter $P_1$ as 0. Therefore, the position of the mountain 162L is the same as the position of the mountain 162 in the image 160. The movement distances from the parameter $P_1$ to the parameter $P_5$ are set as $P_1<P_2<P_3<P_4<P_5$. Therefore, in the left-eye image 160L, the tree 166L is moved by a distance larger than that of the person 164L with respect to the image 160. In this way, by increasing the movement amount (i.e. amount of disparity) of a subject located nearer to the mobile phone 101, the subject nearer thereto becomes more three-dimensional, so that a three-dimensional image that can be viewed in a similar way as when a subject is vied by the bodily eye can be displayed.

The mobile phone 101 creates two images having disparity therebetween, the right-eye image 160R and the left-eye image 160L, based on the image 160 and the acquired parameters. The mobile phone 101 displays the right-eye image 160R and the left-eye image 160L in a superposed manner to display them as a three-dimensional image.

In the three-dimensional image obtained by displaying the two images of the right-eye image 160R and the left-eye image 160L of Step S22 in a superposed manner, a disparity of the tree 166 is larger than a disparity of the person 164. Thus, the three-dimensional image in which the tree 166 looks more three-dimensionally than the person 164 is obtained. In other words, the three-dimensional image in which the tree 166 located nearer to the mobile phone 101 has more stereoscopic effect is displayed.

When the images illustrated at Step S22 of FIG. 11 are acquired and then an operation of correcting the stereoscopic effect of the subject is input by the user, the mobile phone 101 corrects the acquired images based on the input operation. For example, when the user inputs an operation of correction to enhance the stereoscopic effect of the person 164 among the subjects, i.e., correction to display the person 164 more three-dimensionally, the mobile phone 101 performs a correction process of moving a person 164La in a left-eye image 160La in a direction of arrow 167a (rightward in the screen) as illustrated at Step S24. Specifically, the mobile phone 101 adjusts the parameter associated with the image of the person 164. More specifically, the parameter associated with the image of the person 164 is changed from the parameter $P_2$ to the parameter $P_3$ associated with the subject at a position nearer to the mobile phone 101. Thus, the person 164La is moved more rightward than the person 164L. A mountain 162La and a tree 166La as other subjects in the left-eye image 160La are not changed from the left-eye image 160L. A right-eye image 160Ra is not changed from the image 160 because it is the reference image. In other words, a mountain 162Ra, a person 164Ra, and a tree 166Ra in the right-eye image remain 160Ra the same as the mountain 162, the person 164, and the tree 166 in the image 160.

In the three-dimensional image obtained by displaying the two images of the right-eye image 160Ra and the left-eye image 160La of Step S24 in a superposed manner, the disparity of the tree 126 is not changed but the disparity of the person 164 becomes larger. Thus, the three-dimensional image in which stereoscopic effect of the person 164 is enhanced can be obtained. The person 164 corresponds to the parameter $P_3$, and therefore the three-dimensional image obtained by displaying the right-eye image 160Ra and the left-eye image 160La in a superposed manner is displayed as a three-dimensional image in which the tree 166 nearer to the mobile phone 101 than the person 164 has more stereoscopic effect.

The case of enhancing the stereoscopic effect of the person has been discussed in the embodiment; however, the embodiment is not limited thereto. For example, when the stereoscopic effect of the person is to be suppressed, the parameter associated with the person has only to be changed to a parameter to be associated with a farther subject. Moreover, the subject is not limited to the person, and therefore the stereoscopic effect of each of the subjects can be corrected.

In this way, even when one image is processed based on a focal distance (parameter associated with the focal distance) to create two images with disparities and the images which can be displayed as a three-dimensional image are created, a three-dimensional image with stereoscopic effect which is desired by the user can be created in the same manner as previously explained, by adjusting a disparity of each subject.

The mobile phone 101 preferably limits correctable range of a parameter, specifically, adjusts a parameter within a range in which the anteroposterior relation with other subject is not reversed (a range in which the anteroposterior relation is maintained). This enables to adjust the stereoscopic effect while suppressing an imbalance of the entire image.

In the embodiment, the focal distance is divided into five ranges for each of which a parameter is set; however, the number of ranges to which the focal distance is divided and the number of parameters are not particularly limited. By dividing the focal distance into more ranges, the stereoscopic effect can be corrected by a more precise range.

Figure 12:
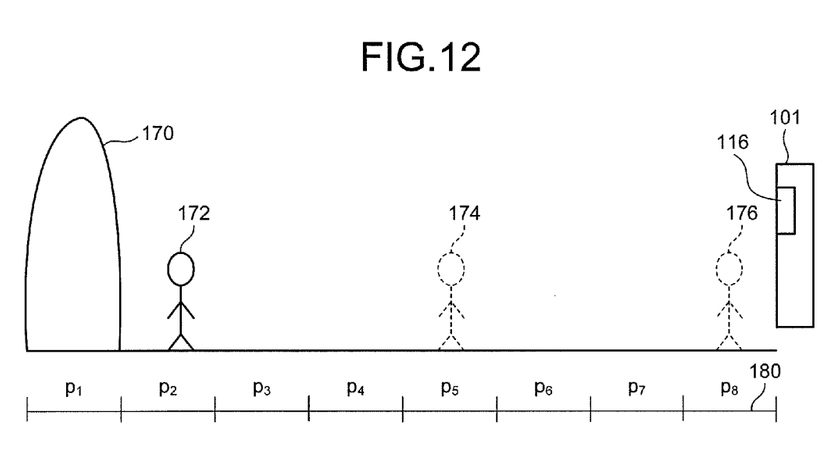
FIG. 12 is an explanatory diagram for explaining an image correction process of the mobile phone.

FIG. 12 is an explanatory diagram for explaining an image correction process of the mobile phone. The mobile phone 101 preferably limits a correction value (correction amount) for correcting stereoscopic effect of a subject to a certain range. By limiting the range of the correction amount, a wide difference between an actual sense of distance and a sense of distance (stereoscopic effect) of a three-dimensional image can be suppressed. The correction to enhance the stereoscopic effect is preferably implemented by allowing the correction amount to be set large when a subject is far from the mobile phone and limiting the correction amount to a small amount when a subject is near to the mobile phone. The correction to suppress the stereoscopic effect is preferably implemented by limiting the correction amount to a small amount when a subject is far from the mobile phone and allowing the correction amount to be set large when a subject is near to the mobile phone. In this way, the range of the correction amount is set according to a distance to a subject to thereby enable more appropriate correction.

As illustrated in FIG. 12, a case in which the mobile phone 101 captures images that include a mountain 170 and a person 172 as subjects and that can be displayed as a three-dimensional image will be explained below. The mountain 170 and the person 172 that are subjects are positions such that the mountain 170 is located at a farthest position from the mobile phone 101 and the person 172 is located before the mountain 170 (the side nearer to the mobile phone 101 than the mountain 170). The mobile phone 101 sets herein a parameter 180 based on a range of each distance from itself. The parameter 180 is set based on each focal distance (distance to each subject), and is set as a parameter $P_1$, a parameter $P_2$, a parameter $P_3$, a parameter $P_4$, a parameter $P_5$, a parameter $P_6$, a parameter $P_7$, and a parameter $P_8$ in order from a farther focal distance. The range nearest in focal distance corresponds to the parameter $P_8$. The mountain 170 is in the range of the parameter $P_1$. The person 172 is in the range of the parameter $P_2$.

In this way, when the subject to be corrected is the person 172, i.e., when the subject is located far from the mobile phone 101, it is set that the correction to enhance stereoscopic-effect is allowed but the correction to suppress stereoscopic-effect is not allowed. However, the correction to enhance the stereoscopic effect is allowed to be up to three stages, i.e., up to the parameter $P_5$.

When the subject to be corrected is a person 174 in the range of the parameter $P_5$, i.e., when the subject is in an intermediate range, it is set that both the correction to enhance the stereoscopic effect and the correction to suppress the stereoscopic effect are allowed. However, the correction to enhance the stereoscopic effect is allowed to be up to two stages, i.e., up to the parameter $P_7$, and the correction to suppress the stereoscopic effect is allowed to be up to two stages, i.e., up to the parameter $P_3$.

When the subject to be correction is a person 176 in the range of the parameter $P_8$, i.e., when the subject is near to the mobile phone 101, it is set that the correction to enhance its stereoscopic effect is not allowed but the correction to suppress the stereoscopic effect is allowed. However, the correction to suppress the stereoscopic effect is allowed to be up to three stages, i.e., up to the parameter $P_5$.

In this way, by limiting the range of the correction amount according to the position of the subject, appropriate correction can be executed.

The mobile phone 101 may perform correction to automatically suppress the stereoscopic effect of a subject that is near in distance. As for a nearer subject, the disparity becomes large and its stereoscopic effect is emphasized, and this may make the subject hard to see. In this case, also, by automatically suppressing the stereoscopic effect, the three-dimensional image can be appropriately viewed.

Because the embodiment can be implemented with an existing device configuration and the device configuration can be easily made, a distance between the housing and the subject is detected using a focal distance calculated by the autofocus function (adjustment function of focal distance) of the camera; however, the embodiment is not limited thereto. Therefore, various functions for calculating a distance to the subject can be used. For example, various distance detecting units for calculating a distance to an object, such as an infrared sensor and an ultrasonic sensor, can be used.

In the embodiment, by displaying a plurality of images on one display unit in a superposed manner, a three-dimensional image is displayed; however, the embodiment is not limited thereto. For example, it may be configured to use a display device including a display surface for a right-eye image and a display surface for a left-eye image to display the images on the respective display surfaces to display a three-dimensional image. In this case, also, a plurality of images can be displayed in a superimposed manner with respect to the sight, and a three-dimensional image can be displayed.

In the embodiment, the example of applying the present invention to the electronic device with the touch panel as a display unit has been explained; however, the present invention is also applicable to an electronic device with a simple display panel, as a display unit, on which a touch sensor is not overlaid.

In the embodiment, the mobile phone has been explained as the one including both the function of capturing a three-dimensional image and the function of displaying the three-dimensional image; however, the embodiment is not limited thereto. The present invention is applicable in various ways to any electronic device if it has the function of displaying the three-dimensional image according to the above-described embodiments.

The invention claimed is:

1. An electronic device, comprising:
    an operating unit;
    an imaging unit configured to capture a plurality of images including a plurality of objects;
    a display unit configured to display the plurality of images in a superposed manner to display a three-dimensional image, wherein the three-dimensional image includes the plurality of objects;
    a storage unit configured to store a plurality of pieces of image data that form the three-dimensional image together with each other; and
    a control unit configured to
        upon the plurality of images being captured by the imaging unit,
            acquire distance information including distances from the imaging unit to the plurality of objects;
        based on an operation detected by the operating unit,
            determine a correction value for stereoscopic effect of an object among the plurality of objects of the three-dimensional image,
        based on the correction value for the stereoscopic effect of the object and the distance information,
            correct a position of the object in at least one of the plurality of images that form the three-dimensional image, to adjust a disparity of the object between the plurality of images without adjusting disparities of the other objects between the plurality of images, and
        superpose the plurality of images including the corrected image on the display unit to display the object as a three-dimensional image.

2. The electronic device according to claim 1, wherein the control unit is configured to, based on the correction value for the stereoscopic effect of the object,
    increase the disparity of the object between the plurality of images to increase the stereoscopic effect, and
    decrease the disparity of the object between the plurality of images to decrease the stereoscopic effect.

3. The electronic device according to claim 2, wherein the control unit is configured to adjust the disparity within a range in which an anteroposterior relation between the plurality of objects is not reversed.

4. The electronic device according to claim 1, wherein the control unit is configured to determine, based on distances between the plurality of objects, an allowed range of the correction value.

5. The electronic device according to claim 1, wherein
    the imaging unit includes two cameras that are separated by a predetermined interval, and
    the control unit is configured to
        analyze images respectively captured by the two cameras, and
        acquire distance information from each of the two cameras to the object based on a disparity between the two images respectively captured by the two cameras.

6. The electronic device according to claim 1, wherein
    the imaging unit includes a focus-position adjustment mechanism, and
    the control unit is configured to
        analyze focal distance information acquired by moving a focus position using the focus-position adjustment mechanism when the images are captured, and
        acquire the distance information from the imaging unit to the object.

* * * * *